(12) United States Patent
Honninger et al.

(10) Patent No.: US 7,508,847 B2
(45) Date of Patent: Mar. 24, 2009

(54) ULTRA-SHORT LASER SOURCE WITH RARE EARTH IONS AND STABLE PULSE TRAIN AND DEVICE FOR LENGTHENING A LASER CAVITY

(75) Inventors: Clemens Honninger, Cestas (FR); Antoine Courjaud, Leognan (FR); Eric Mottay, Begles (FR); François Salin, Gradignan (FR)

(73) Assignees: Amplitude Systemes, Talence (FR); Centre National de la Recherche Scientifique (CNRS), Paris (FR); Universite de Bordeaux 1, Talence (FR)

( * ) Notice: Subject to any disclaimer, the term of this patent is extended or adjusted under 35 U.S.C. 154(b) by 231 days.

(21) Appl. No.: 10/586,963

(22) PCT Filed: Jan. 25, 2005

(86) PCT No.: PCT/FR2005/050044

§ 371 (c)(1),
(2), (4) Date: Sep. 7, 2006

(87) PCT Pub. No.: WO2005/076421

PCT Pub. Date: Aug. 18, 2005

(65) Prior Publication Data

US 2007/0160104 A1    Jul. 12, 2007

(30) Foreign Application Priority Data

Jan. 26, 2004    (FR) .................................. 04 50135

(51) Int. Cl.
*H01S 3/30*    (2006.01)
*H01S 3/14*    (2006.01)

(52) U.S. Cl. ............................................ 372/5; 372/39

(58) Field of Classification Search .................... 372/9, 372/30, 39, 92, 97, 98, 99, 101, 5
See application file for complete search history.

(56) References Cited

FOREIGN PATENT DOCUMENTS

WO    WO 02/21643    3/2002

OTHER PUBLICATIONS

Prasankumar et al, An extended cavity femtosecond Cr:LiSAF laser pumped by low cost diode lasers, optics express, vol. 11, No. 11, 1265-1269.*

(Continued)

*Primary Examiner*—Armando Rodriguez
(74) *Attorney, Agent, or Firm*—Young & Thompson (57) ABSTRACT

A rare earth ion ultrashort laser source includes a resonant cavity having a first output face partially reflecting and a second reflecting face. The source also includes a first active material, which receives a pump luminous flux transmitted via a first solid laser pump source. The resonant cavity exhibits a length of optical path travelled by the pulses greater than 7.5 m so that the pulsed energy $E_L$ is greater than 100 nJ, the optical path including at least one passage in the active material and the ultrashort laser source includes elements for lengthening the resonant cavity thereby enabling to extend the length of the optical path travelled by the luminous pulses in the resonant cavity, the ABCD propagation matrix of the resonant cavity being close to the unit matrix so that the features of the luminous beam going back and forth in the resonant cavity remain unchanged.

19 Claims, 5 Drawing Sheets

OTHER PUBLICATIONS

Kolev et al., "Passive mode locking of a Nd:YV04 laser with an extra-long optical resonator," *Optics Letters*, vol. 28, No. 14, Jul. 15, 2003, pp. 1275-1277.

Prasankumar et al., "An extended cavity femtosecond Cr:LiSAF laser pumped by low cost diode lasers," *Optics Express*, vol. 11, No. 11, Jun. 2, 2003, pp. 1265-1269.

Aus Der Au et al., "Femtosecond microjoule pulses with 15.8 W average power from a passively mode-locked diode-pumped Yb:YAG thin-disk laser," *Conference on Lasers and Electro-Optics, Technical Digest*, vol. 39, May 7, 2000, pp. 82 and 83.

Papadopoulos et al., "Passively mode-locked diode-pumped Nd:YVO4 oscillator operating at an ultralow repetition rate," *Optics Letters*, vol. 28, No. 19, Oct. 1, 2003, pp. 1838-1840.

Spühler et al., "Passively mode-locked high-power Nd:YAG lasers with multiple laser heads," *Applied Physics*, vol. B71, No. 1, Jul. 2000, pp. 19-25.

Brunner et al., "Widely tunable pulse durations from a passively mode-locked thin-disk Yb:YAG laser," *Optics Letters*, vol. 26, No. 6, Mar. 15, 2001, pp. 379-381.

Hoenninger et al., "Q-switching stability limits of continuous-wave passive mode locking," *Journal of the Optical Society of America*, vol. 16, No. 1, Jan. 1999, pp. 46-56.

Keller et al., "Semiconductor Saturable Absorber Mirrors (SESAM's) for Femtosecond to Nanosecond Pulse Generation in Solid-State Lasers," *IEEE Journal of Selected Topics in Quantum Electronics*, vol. 2, No. 3, Sep. 1, 1996, pp. 435-451.

Sennaroglu et al., "Design criteria for Herriott-type multi-pass cavities for ultrashort pulse lasers," *Optics Express*, vol. 11, No. 9, May 5, 2003, pp. 1106-1113.

Klopp et al., "Passively mode-locked Yb:KYW laser pumped by a tapered diode laser," *Optics Express*, vol. 10, No. 2, Jan. 28, 2002, pp. 108-113.

Aus Der Au et al., "16.2-W average power from a diode-pumped femtosecond Yb:YAG thin disk laser," *Optics Letters*, vol. 25, No. 11, Jun. 1, 2000, pp. 859-861.

Courjaud et al., "1.5 W femtosecond diode-pumped Yb:KGW laser," *Advanced Solid-State Lasers Conference*, Dec. 31, 2001, pp. 161-163.

* cited by examiner

ULTRA-SHORT LASER SOURCE WITH RARE EARTH IONS AND STABLE PULSE TRAIN AND DEVICE FOR LENGTHENING A LASER CAVITY

This is a 371 National Stage application of International application no. PCT/FR2005/050044, filed Jan. 25, 2005, which claims priority to French application no. 04/50135, filed Jan. 26, 2004. The entire contents of the above-referenced applications are hereby incorporated by reference in their entirety.

The present invention relates to a rare earth ion ultrashort laser source providing stable pulse train.

BACKGROUND OF THE INVENTION

Since the realisation by Ippen and Shank in 1974 [Appl. Phys. Letters; 24, (1974) 373] of the first laser transmitting pulses shorter than the picosecond (1 ps=$10^{-12}$ s), the duration of pulses has always progressively been reduced. The lasers generating pulses whereof the duration is smaller than the picosecond are designated as "Ultrashort lasers". They are extremely popular and have given rise to intense research efforts in the scientific community because the ultrashort pulses then generated enable temporal study of the dynamics of ultrarapid processes (smaller than $10^{-10}$ s) inaccessible hitherto to most detectors. With these ultrashort light sources, new fields of investigation and of application open as in the fragmentation and/or desorption process of multiphotonic adsorbed molecules, metrology, non-destructive studies of chemical mechanisms in the biological cells, etc.

Lasers generating ultrashort pulses are known, involving rare earth ions amplifying media (Ytterbium (Yb), Neodymium (Nd), ... ). These lasers can advantageously be pumped directly by a semiconductive laser, which makes them lasers which are compact, reliable and little costly. In particular, the amplifying media doped with the Ytterbium ion may be pumped by power laser diodes since the Ytterbium ion exhibits a near-infrared absorption bandwidth. The agreement between the transmission wavelength of the power laser diode with an absorption ray of the amplifying medium doped with the Ytterbium ion enables excellent coupling efficiency. Moreover, the transmission wavelength of the power laser diode is close to the laser transmission wavelength which ranges typically between 1020 and 1070 nm. There result an excellent quantal throughput and a small heat loss in the amplifying medium.

A major problem, however, in the stable generation of ultrashort pulses for the lasers lies in the determination of parameters to obtain modes without Q-switching ("Triggered Mode"—QS). Blocking modes contributes indeed to obtaining ultrashort pulses whereas the triggered mode is characterised by the occurrence of instabilities in the train of ultrashort pulses transmitted via the ultrashort laser. Such instabilities may translate as strong modulations in the pulse train. Such instabilities are notably marked for ultrashort lasers using low-cross-section amplifying media with efficient transmission including the amplifying media doped with the Ytterbium ion.

A strategy to avoid such instabilities which are characteristic of a triggered cycle, consists in selecting parameters for the laser, notably diameters of the laser mode in the amplifying medium, ... enabling to suppress such instabilities as well as to block certain modes. This strategy then leads to doing away with the implementation of laser configurations wherein the window for obtaining mode-blocking is too short or does not exist. Still, to avoid such configurations is problematic for amplifying rare earth ion media exhibiting relaxation of the important top level or a small efficient transmission section.

In this view, the triggered mode renders therefore the ultrashort lasers hardly useable which employ rare earth ion amplifying media in applications requiring a reliable and stable behaviour with time.

SUMMARY OF THE INVENTION

Until now, no means have been suggested, enabling satisfactory stability.

The object of the present invention is to suggest a rare earth ion ultrashort laser source simple in its design and in its operating mode, compact, little costly and providing a continuous stable train of ultrashort pulses with very high pulse energy, typically greater than 100 nJ.

In this view, the invention relates to a rare earth ion ultrashort laser source including on the one hand a resonant cavity having a first output face partially reflecting and a second reflecting face, and on the other hand a first active material, placed inside the resonant cavity, having a saturation fluency greater than 3 J/cm$^2$ and receiving a pump luminous flux, said flux being transmitted by a first solid laser pump source, said source transmitting luminous pulses having an energy $E_L$.

According to the invention,
- the resonant cavity exhibits a length of optical path travelled by said pulses greater than 7.5 m so that the pulsed energy $E_L$ is greater than 100 nJ, said optical path including at least one passage in said active material,
- the ultrashort laser source comprises means for lengthening the resonant cavity thereby enabling to extend the length of the optical path travelled by said luminous pulses in the resonant cavity of a compact laser source, the ABCD propagation matrix of the resonant cavity being close to the unit matrix so that the features of the luminous beam going back and forth in the resonant cavity remain unchanged.

By "ultrashort laser source" is meant here a laser source transmitting luminous pulses having a duration smaller than 10 picoseconds and more preferably, smaller than a picosecond.

In various possible embodiments, the present invention also relates to the characteristics which will appear during the following description and which should be considered individually or according to all their technically possible combinations:
- the length of optical path ranges between 7.5 m and 300 m,
- the means for elongating the cavity include at least one device for elongating the cavity including at a first end a first planar mirror and at the other end a second planar mirror, said first and second planar mirrors being placed respectively at the respective focus of a first and second concave spherical mirrors, said second planar mirror having a normal axis at its surface tilted vertically by an angle θ/n with respect to a plane parallel to the plane containing the first planar mirror so that a luminous pulse entering said device under an angle of incidence θ in a vertical plane and under an angle Φ in a horizontal plane with respect to the normal to the surface of the first planar mirror is subjected to n/2 reflections on the second spherical mirror before exiting said device,
- an input mirror, situated at the front and spaced away from the first spherical mirror enables injecting and ejecting luminous pulses in the device for elongating the cavity, the laser source comprises at least one second active material placed inside the resonant cavity, said second active material receiving a pump luminous flux, said pump luminous flux is transmitted via a second solid laser pump source, the number of passages in each active material is greater than or equal to 2, the number of passages in each active material is equal to 4, the ultrashort laser source comprises a dichroic mirror placed between said active material and the corresponding solid laser pump source, said mirror receiving the luminous pulses from said active material and reflecting said luminous pulses towards the active material, the solid laser pump source is a semiconductive laser, the active material comprises ytterbium ions, the active material comprises neodymium ions.

The invention also relates to an elongation device of a laser cavity defining an optical axis.

According to the invention, this device comprises two planar mirrors placed at the respective focus of two concave spherical mirrors, said focuses being on the axis of the cavity and one of the planar mirrors being tilted by an angle $\theta/n$ with respect to said axis.

Such arrangement enables to elongate the cavity while preserving the properties of the beam.

BRIEF DESCRIPTION OF THE DRAWINGS

The invention will be described more in detail with reference to the appended drawings wherein.

DETAILED DESCRIPTION OF THE INVENTION

The purpose of the invention is to suppress the instabilities linked with the cycle triggered in rare earth ion ultrashort laser sources by means of a resonant cavity of great length and/or by means of a configuration of the resonant cavity enabling several passages in at least one amplifying medium by a cavity going back and forth.

The rare earth ion ultrashort laser source of the invention includes a resonant cavity 1 having a first output face 2 partially reflecting and a second reflecting face 3. Between both these faces 2,3 is defined an optical path travelled by luminous pulses, said optical path including at least one passage in a first active material 4 having a saturation fluency greater than 3 J/cm$^2$, placed inside the resonant cavity 1. In a preferred embodiment, the resonant cavity 1 includes at least one second active material 5 having a saturation fluency greater than 3 J/cm$^2$. Each of said active materials 4,5 can be pumped by a different pump laser source 6. These pump laser sources 6 are solid lasers transmitting a pump luminous flux 7. In a preferred embodiment, each pump laser source 6 is a semiconductive laser. The wavelength $\lambda_D$ whereon is centred the pump luminous flux 7 ranges typically between 800 nm and 1 µm. The rare earth ions used in the active material 4 are selected among the following materials: Ytterbium (Yb), Neodymium (Nd) or any other equivalent material.

The length of optical path travelled by said pulses in the resonant cavity 1 is greater than 7.5 m so that the pulsed energy $E_L$ is greater than 100 nJ for an average power of 2 W.

Figure 1:
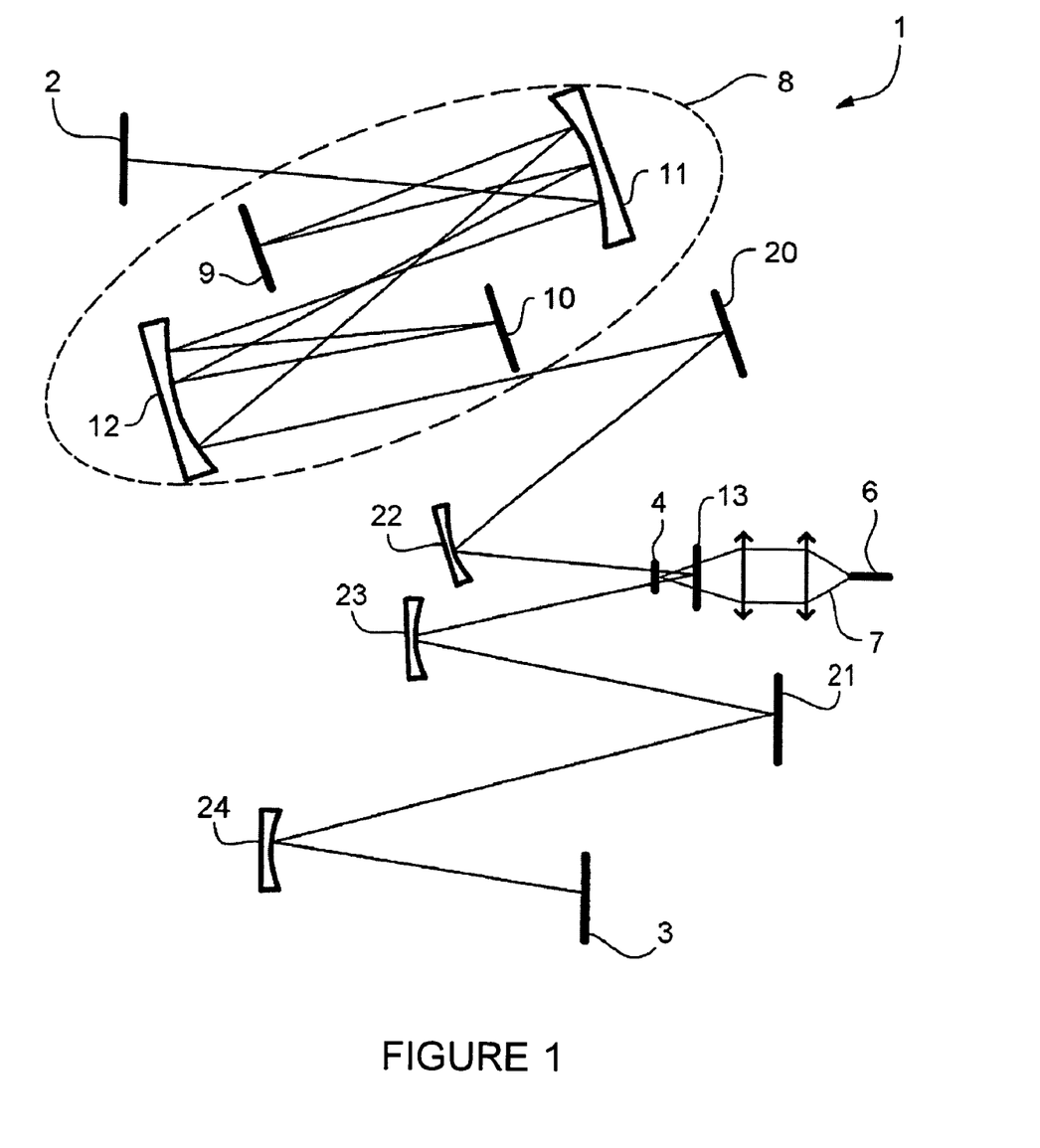
FIG. 1 is a diagrammatic representation of an ultrashort laser source, according to a first embodiment of the invention.

FIG. 1 shows a rare earth ion ultrashort laser source according to a first embodiment of the invention. The distance between the first and second faces 2, 3 is typically of the order of a few meters, for example 3.33 m which corresponds to a frequency of 45 MHz in blocked mode cycle. The cavity is folded by the planar mirrors 20, 21 and by the concave mirrors 22, 23, 24. It also comprises a single active material 4 having a saturation fluency greater than 3 J/cm$^2$, for example a crystal Yb:KGW, this active material 4 being placed inside the resonant cavity 1. This active material 4 receives a pump luminous flux 7 emitted via a solid laser pump source 6 which is preferably a semiconductive laser. In order to increase the length of optical path travelled by the pulses in the resonant cavity 1, such cavity 1 comprises means for lengthening the resonant cavity. The increase in length of optical path is obtained by causing the luminous pulses to perform multiple laser passages inside at least one device for elongating the cavity 8.

The ABCD propagation matrix of the resonant cavity is close to the unit matrix so that the characteristics (divergence, dimension, . . . ) of the luminous beam going back and forth in the resonant cavity 1 remain unchanged. The geometrical parameters of the resonant cavity including the elongation means with respect to a shorter cavity without any elongation means are identical.

The optical characteristics of a laser beam are very different from those of the conventional luminous beams from natural or artificial sources (sun, lamps, . . . ). The theories of geometrical optics prove insufficient for describing the spatial transformations of the laser beams. The propagation of the laser beams largely resorts to the diffraction phenomenon.

Thus, an ABCD propagation matrix or transfer matrix of the article <<Laser Beams and Resonators>>(H. Kogelnik and T. Li, Applied Optics, vol. 5 No. 10, October 1966) describes the transformation undergone by a luminous ray propagating between two planes surrounding a paraxial optical system. Such matrix acts upon the coordinates of a ray issued from the starting plane. It relates to Gaussian beams, among other things.

Figure 2:
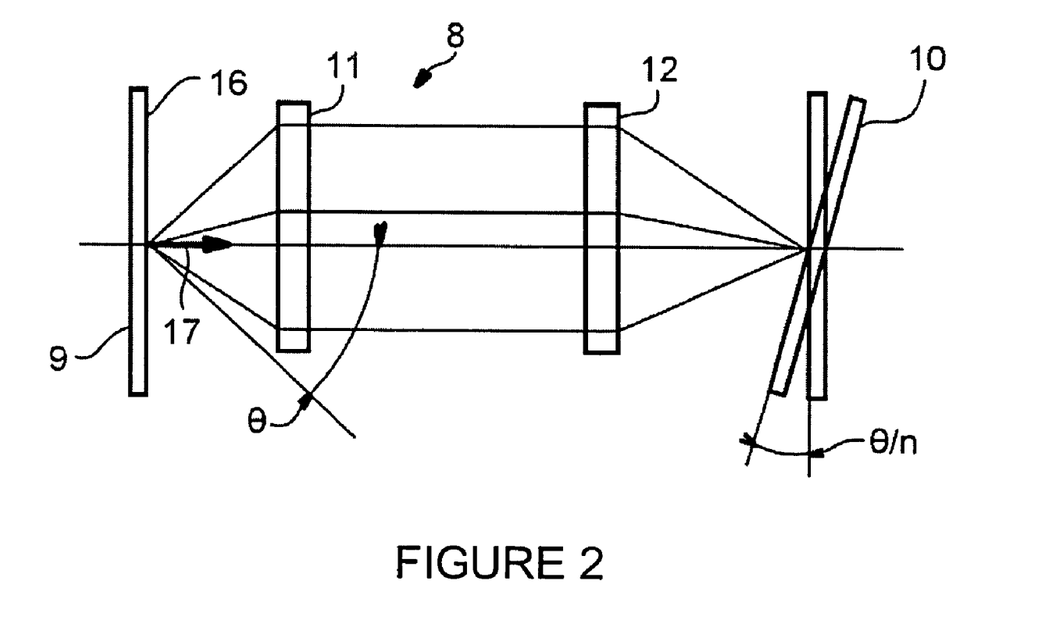
FIG. 2 is a diagrammatic representation and a device for elongating the cavity according to a particular embodiment of the invention.

The means for elongating the cavity 8 include here a single device for elongating the cavity represented on FIG. 2 including at a first end a first planar input mirror 9 and at the other end a second planar mirror 10. These first and second planar mirrors 9, 10 are placed respectively at the respective focus of a first and of a second curved mirrors 11, 12. The separation between the curved mirrors 11, 12 is equivalent to the sum of their focal. Advantageously, these curved mirrors 11, 12 are concave spherical mirrors. To perform several passages in the device for elongating the cavity 8, the laser pulses enter the elongation device 8 under an angle of incidence $\theta$ with respect to the normal 16 at the surface 17 of the first planar mirror. By tilting vertically by an angle $\theta/n$, the second planar mirror 10 at the other end of the device, the pulses perform n passages in the vertical plane of the device 8 before exiting through the same path. To separate the luminous pulses entering the device 8 and those coming out of the device for elongating the cavity 8, the luminous pulses do not enter solely the device 8 under an angle of incidence $\theta$ with respect to the normal at the surface of the first planar mirror 9, said angle being contained in a vertical plane, but also under an angle $\phi$ with respect to said normal, said angle φ being contained in a horizontal plane. The injection and the ejection of luminous pulses then takes place via an input mirror, for example an half-moon shaped mirror, situated at the front and offset downwards of the first curved mirror of the device.

Figure 3:
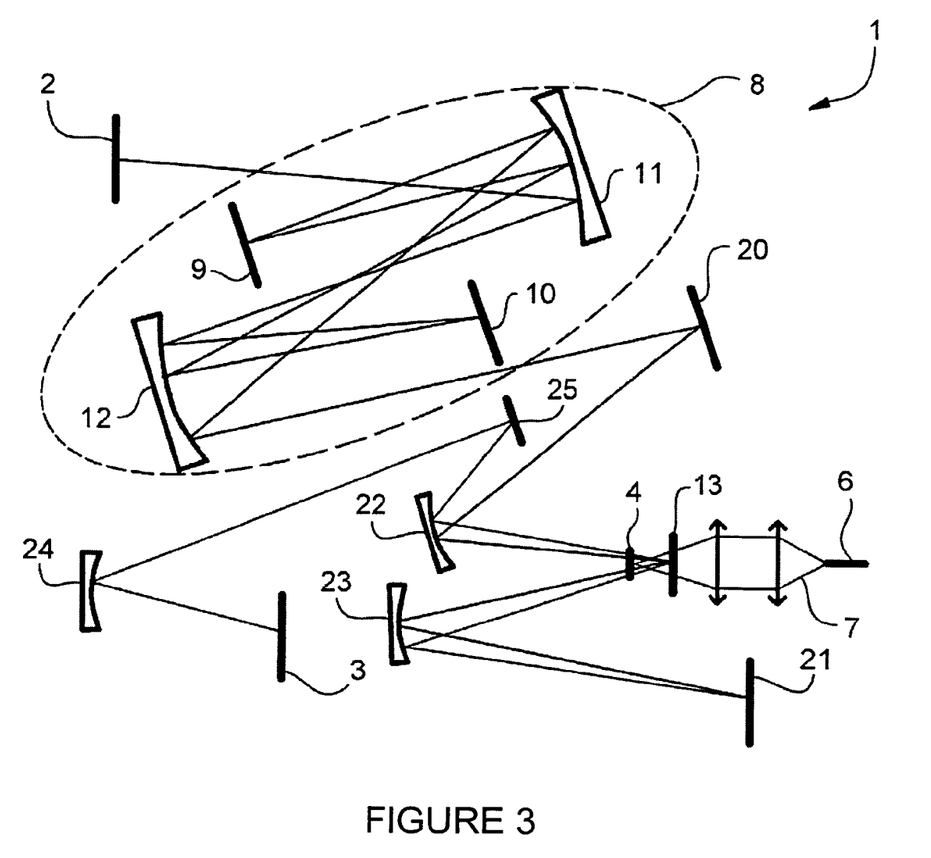
FIG. 3 is a diagrammatic representation of an ultrashort laser source, according to a second embodiment of the invention.

FIG. 3 shows a rare earth ion ultrashort laser source according to a second embodiment of the invention. The elements of FIG. 2 having the same references as the elements described on FIG. 1 represent the same objects. In this particular embodiment, by reason of the orientation of the mirrors 20 to 25 in the cavity, the luminous pulses perform several passages, here 4, in the active material 4 by going back and forth in the resonant cavity 1. Running m times through the gain medium enables to multiply the linear gain by going back and forth in the resonant cavity 1 by m, which amounts to changing the amplification G of the medium in $G^m$, without changing the losses of the cavity, and enables, for a given pulse energy, higher saturation of the laser gain. This multiple passage through the active material 4 may be associated with an elongation of the resonant cavity 1 obtained by implementing the means for elongating the cavity. The ultrashort laser source comprises a dichroic mirror 13 placed between said active material 4 and the corresponding solid laser pump 30 source 6, said mirror 13 receiving the luminous pulses of said active material 4 and reflecting said luminous pulses towards the active material.

Figure 4:
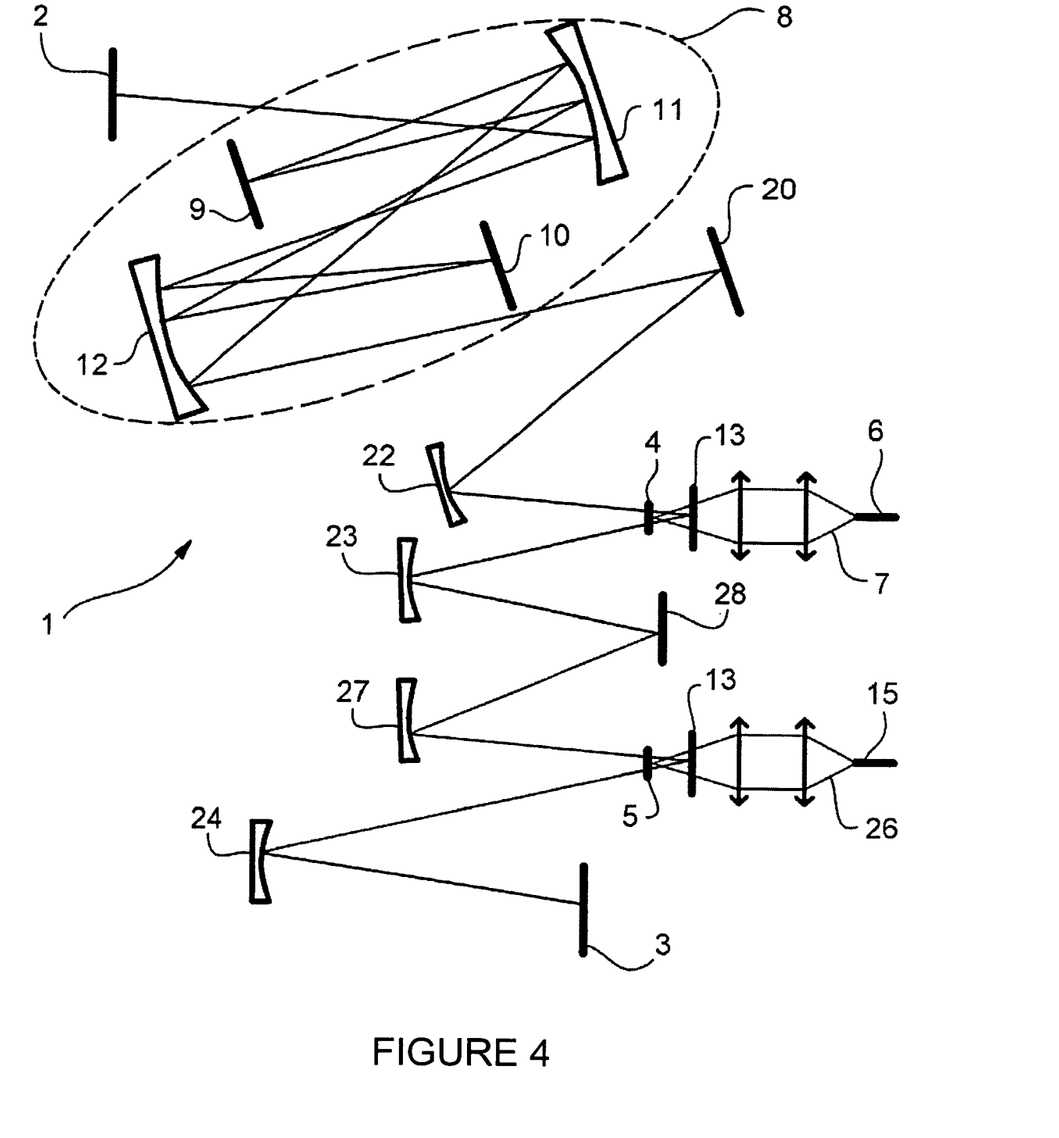
FIG. 4 is a diagrammatic representation of an ultrashort laser source, according to a third embodiment of the invention.

FIG. 4 shows a rare earth ion ultrashort laser source according to a third embodiment of the invention. The elements of FIG. 3 having the same references as the elements described on FIG. 2, represent the same objects. In this particular embodiment, the laser source comprises at least one second active material 5 placed inside the resonant cavity 1, the mirrors 22, 23, 24, 27, 28 fold the beam and said second active material 5 receiving a pump luminous flux 26 transmitted via a second solid laser pump source 15.

The cavity laser comprises the diode laser, the focus optics in the gain medium, the gain medium (Yb:KGW), two curved mirrors for focussing the laser mode in the gain medium, a third curved mirror for focussing the laser mode on a non linear mirror, so as to start and stabilise the operating pulse mode of the laser. In this configuration, the pulses run twice through the gain medium by going back and forth in the resonant cavity. Two other mirrors are folding planar mirrors as to render the more compact cavity.

The device for elongating the cavity comprises a planar mirror at the input of the multi-passage cavity, two planar mirrors situated at the focuses of two curved mirrors of 0.5 m curving radius which are separated by a distance of approx. 1 m, a planar mirror at the output which directs the laser beam, towards the output coupler. In a single passage through the elongation device, the pulses travel 6 times under the different angles with respect to the optical axis of the system, which correspond to 12 passages by going back and forth in the laser cavity.

The total length of the cavity is 9.5 m, which corresponds to a frequency of 16.8 MHz.

The invention would not be limited to the foregoing description and is liable to modifications with the evolution of technologies. Substitutions and/or modifications in the general structure as well as in details of the present device may be brought by the man of the art without departing from the spirit of the present invention. Thus, it is possible to combine indifferently the various embodiments suggested in order to obtain a ultrashort laser source transmitting luminous pulses having an energy greater than 100 nJ.

A theoretical approach has been developed to explain the suppression of the instabilities associated with the triggered cycle in ultrashort lasers with rare earth ions (Ultrafast Ytterbium-Doped Bulk Lasers and Laser Amplifiers, Clemens Hoenninger, Hartung-Gorre Verlag, 1998, ISBN 3-89649-391-2).

The relation between the average power, the energy per pulse and the peak power of an ultrashort laser source is given by:

$$P_{average} = E_{pulse} \times f_{resp} = P_{peak} \times \tau_{pulse} \times f_{resp} \qquad (1)$$

where $\tau_{pulse}$ is the pulse duration and $f_{resp}$ is the repetition frequency with $$f_{resp} = \frac{c}{2 \times L_{cav}}, \qquad (2)$$

$L_{cav}$ being the length of the optical path travelled by the pulses in the resonant cavity.

If the mode blocking device is a slow saturable absorbent ($t_{relax} > t_{pulse}$), which is restored completely during a two-way travel of cavity ($t_{relax} << 1/f_{resp}$), whereof the saturation parameters are mainly described by its energy of saturation $E_{sat,A}$ and its modulation depth $\Delta R$, the stability condition of the train of pulse with blocked modes is given by:

$$\left( \frac{g_{eff}}{g} - \frac{dg_{eff}}{dE_{pulse}} \right) \bigg|_{E_{pulse}} \cdot E_{pulse}^2 > E_{sat,L} \cdot E_{sat,A} \cdot \Delta R \qquad (3)$$

where $g_{eff}$ is the stationary effective gain, taking into account the spectral filtering effects and $E_{sat,L}$ is the laser saturation energy given by:

$$E_{sat,L} = \frac{h\nu}{m \cdot \sigma_{em}^{(L)}} A_{eff,L} \qquad (4)$$

where $\sigma_{em}$ is the transmission section at the wavelength laser, m is the number of passages in the laser medium by going back and forth of cavity, and $A_{eff,L}$ is the size of the laser mode in the active material.

According to the relation (1) linking the pulsed energy and the repetition frequency, and according to the condition of stability (3), there can be derived that a very long resonant cavity 1 or a multi-passage configuration in the active material 4, 5 suppresses the instabilities linked with the operation in triggered mode in the train of pulses.

Both these means enable to saturate sufficiently the laser gain during a two-way travel of cavity. A resonant cavity 1 exhibiting a long optical path enables to generate, according to the equations (1) and (2) high energy ultrashort pulses. A multi-passage configuration where m is the number of passages in the active material 4, 5 by a two-way travel of cavity is equivalent to a single resonant cavity where the gain would be saturated by a pulse having m times the energy of the pulse circulating inside the resonant cavity.

This is particularly interesting for Ytterbium-doped lasers, but also applies to all materials with a small efficient transmission section.

Figure 5:
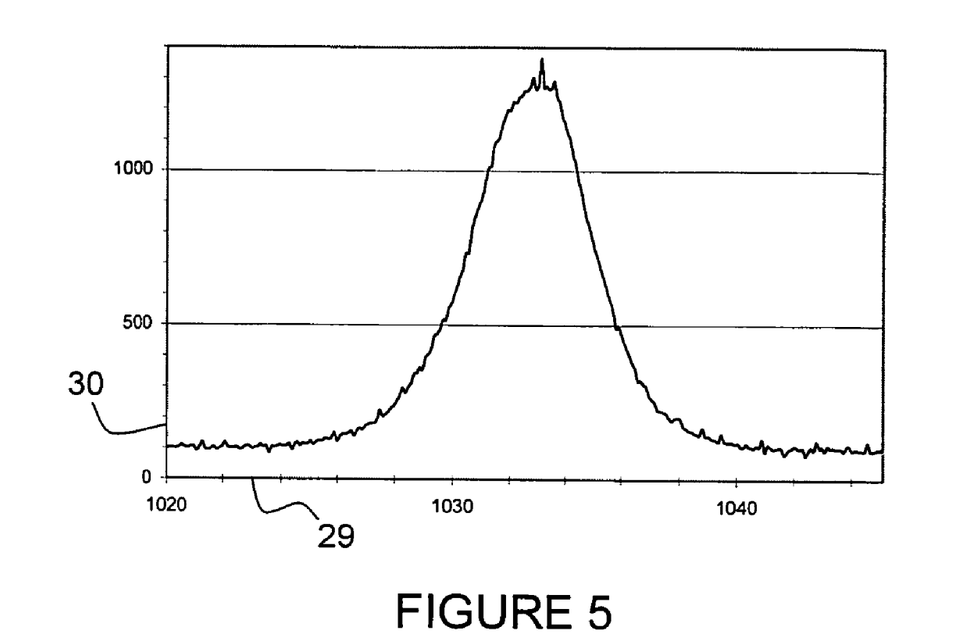
FIG. 5 shows a spectrum obtained in a first embodiment of the invention.
Figure 6:
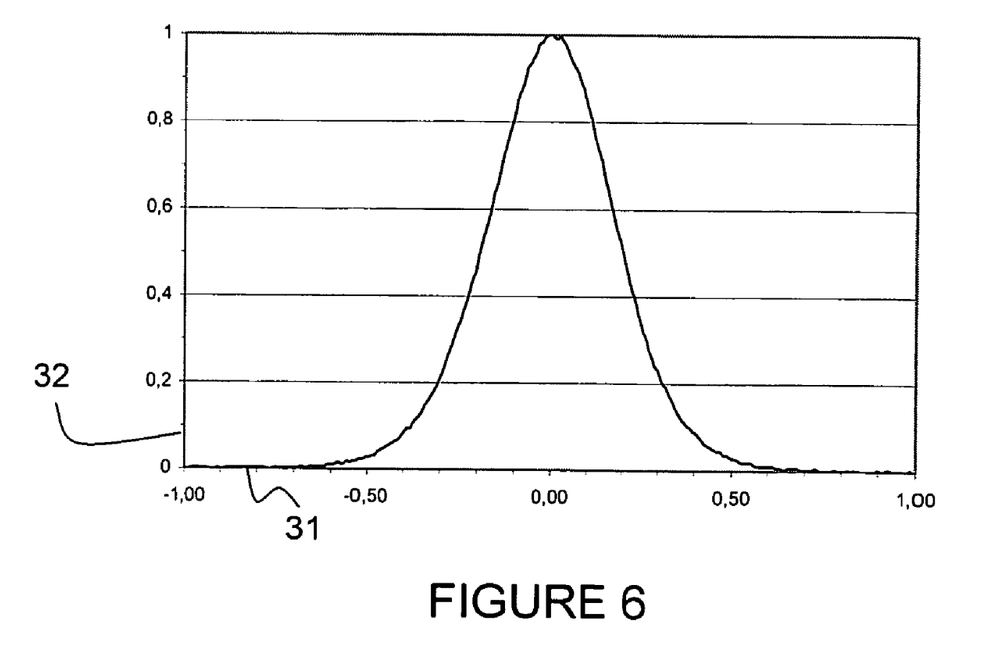
FIG. 6 shows the auto-correlation obtained in the embodiment of FIG. 5.

FIGS. 5 and 6 specify results obtained by implementing the invention for the realisation of a resonator having a long optical cavity and operating in blocked mode cycle. A device for elongating the cavity enables to provide a cavity of 9.5 m in length. Femtosecond pulses at 15.8 MHz frequency can be obtained.

FIGS. 5 and 6 shows the spectrum and the autocorrelation respectively. On FIG. 5, the axis of the abscissae 29 represents the wavelength (in nm) and the axis of the ordinates 30 represents the measured intensity. On FIG. 6, the axis of the abscissae 31 represents the standardised auto-correlation (in ps) of the pulse with time, providing the pulse duration and the axis of the ordinates 32 represents the pulse energy. The spectral width is 4.6 nm and the duration of the pulses is 250 fs. The average power is 2 W corresponding to a pulse energy of 120 nJ.

The present invention can advantageously be implemented with an energy per pulse greater than 100 nJ in sub-picosecond cycle to meet requirements covered traditionally by much higher energy systems. This pulse energy is notably sufficient to obtain a laser ablation effect or a modification effect of the internal structure of the materials to be treated, for example in the following domains:

Internal marking of transparent materials,
changing of the refraction index, for example for the realisation of waveguides,
micro- and nano-texturing,
rapid prototyping by the creation of micro-objects,
refractive ocular surgery,
micro-machining.

The invention claimed is:

1. A rare earth ion ultrashort laser source comprising:
a resonant cavity (1) having a first output face (2) partially reflecting and a second reflecting face (3),
a first active material (4) placed inside the resonant cavity said first active material having a saturation fluency greater than 3 J/cm$^2$ and receiving a pump luminous flux (5), said pump luminous flux being transmitted by a first solid laser pump source (7), said first solid laser pump source transmitting luminous pulses having an energy $E_L$,
wherein:
the resonant cavity (1) exhibits a length of optical path travelled by said luminous pulses greater than 7.5 m so that the pulsed energy $E_L$ is greater than 100 nJ, said optical path including at least one passage in said first active material (4),
the ultrashort laser source comprises a member for lengthening the resonant cavity (1) thereby extending the length of the optical path travelled by said luminous pulses in the resonant cavity (1) of said ultrashort laser source,
the resonant cavity (1) comprises an ABCD propagation matrix that is close to a unit matrix so that the features of the luminous pulses going back and forth in the resonant cavity (1) remain unchanged.

2. The ultrashort laser source according to claim 1, wherein the length of said optical path ranges between 7.5 m and 300 m.

3. The ultrashort laser source according to claim 1, wherein said member for lengthening the cavity (8) includes at least one device having at a first end a first planar mirror (9) and at the other end a second planar mirror (10), said first and second planar mirrors (9, 10) being placed respectively at the respective focus of a first and second concave spherical mirrors (11, 12), said second planar mirror (10) having a normal axis at its surface tilted vertically by an angle θ/n with respect to a plane parallel to the plane containing the first planar mirror (9) so that a luminous pulse entering said device (8) under an angle of incidence θ in a vertical plane and under an angle Φ in a horizontal plane, with respect to the normal at the surface of the first planar mirror (9) is subjected to n/2 reflections on the second spherical mirror (10) before exiting said device.

4. The ultrashort laser source according to claim 3, comprising an input mirror, situated at a front end and spaced away from the first spherical mirror (11) that enables injecting and ejecting said luminous pulses in the device for elongating the cavity.

5. The ultrashort laser source according to claim 1, wherein the first solid laser source comprises at least one second active material (5) placed inside the resonant cavity (1), said second active material (5) receiving a pump luminous flux (14).

6. The ultrashort laser source according to claim 5, wherein said pump luminous flux (14) received in said second active material is transmitted via a second solid laser pump source (15).

7. The ultrashort laser source according to claim 5, wherein the number of passages travelled by said luminous pulses in said first active materials (4,5) is greater than or equal to 2.

8. The ultrashort laser source according to claim 7, wherein the number of passages travelled by said luminous pulses in said first and second active materials (4, 5) is equal to 4.

9. The ultrashort laser source according to claim 7, further comprising a dichroic mirror (13) placed between said first and second active materials (4, 5) and the corresponding solid laser pump sources (7, 15), said dichroic mirror receiving the luminous pulses from said first and second active materials (4, 5) and reflecting said luminous pulses towards said first and second active materials (4, 5).

10. The ultrashort laser source according to claim 1, wherein the first solid laser pump source (15) is a semiconductive laser.

11. The ultrashort laser source according to claim 1, characterised in that said first active material (4, 5) comprises ytterbium ions.

12. The ultrashort laser source according to claim 5, wherein said first active material (4, 5) comprises neodymium ions.

13. The ultrashort laser source according to claim 2, wherein the member for lengthening the cavity includes at least one device having at a first end a first planar mirror (9) and at the other end a second planar mirror (10), said first and second planar mirrors (9, 10) being placed respectively at the respective focus of a first and second concave spherical mirrors (11, 12), said second planar mirror (10) having a normal axis at its surface tilted vertically by an angle θ/n with respect to a plane parallel to the plane containing the first planar mirror (9) so that a luminous pulse entering said device (8) under an angle of incidence θ in a vertical plane and under an angle Φ in a horizontal plane, with respect to the normal at the surface of the first planar mirror (9) is subjected to n/2 reflections on the second spherical mirror (10) before exiting said device.

14. The ultrashort laser source according to claim 2, further comprising at least one second active material (5) placed inside the resonant cavity (1), said second active material (5) receiving a pump luminous flux (14).

15. The ultrashort laser source according to claim 3, further comprising at least one second active material (5) placed inside the resonant cavity (1), said second active material (5) receiving a pump luminous flux (14).

16. The ultrashort laser source according to claim 4, further comprising at least one second active material (5) placed inside the resonant cavity (1), said second active material (5) receiving a pump luminous flux (14).

17. The ultrashort laser source according to claim 8, comprising a dichroic mirror (13) placed between said first and second active materials (4, 5) and the corresponding solid laser pump sources (7, 15), said dichroic mirror receiving the luminous pulses from said first and second active material materials (4, 5) and reflecting said luminous pulses towards said first and second active materials (4, 5).

18. The ultrashort laser source according to claim 3, wherein n is the number of passages of the luminous pulses in the vertical plane of the at least one device (8) before exiting through the same path.

19. The ultrashort laser source according to claim 13, wherein n is the number of passages of the luminous pulses in the vertical plane of the at least one device (8) before exiting through the same path.

* * * * *

UNITED STATES PATENT AND TRADEMARK OFFICE
CERTIFICATE OF CORRECTION

| | | |
|---|---|---|
| PATENT NO. | : 7,508,847 B2 | Page 1 of 1 |
| APPLICATION NO. | : 10/586963 | |
| DATED | : March 24, 2009 | |
| INVENTOR(S) | : Clemens Honninger et al. | |

It is certified that error appears in the above-identified patent and that said Letters Patent is hereby corrected as shown below:

In the Claims

COLUMN 7, LINE 36, CLAIM 1:

delete the "first solid" and replace it with --ultrashort--.
delete the second instance of "pump".

Signed and Sealed this
Eighth Day of July, 2014

Michelle K. Lee
*Deputy Director of the United States Patent and Trademark Office*